US008355966B1

(12) United States Patent
Vu et al.

(10) Patent No.: US 8,355,966 B1
(45) Date of Patent: Jan. 15, 2013

(54) PAYROLL E-FILE AND E-PAY ASSISTANT

(75) Inventors: Miriam Nga-Shun Vu, San Francisco, CA (US); Nedda Cox, Longmont, CO (US); Julie Stanford, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 12/714,144

(22) Filed: Feb. 26, 2010

(51) Int. Cl.
*G07F 19/00* (2006.01)
*G06F 17/22* (2006.01)
*G06F 3/00* (2006.01)
*G06F 3/048* (2006.01)
*G06F 17/27* (2006.01)
*G06F 17/28* (2006.01)
*G06F 17/26* (2006.01)
*G06F 17/25* (2006.01)
*G06F 17/24* (2006.01)
*G06F 17/21* (2006.01)
*G06F 17/20* (2006.01)
*G06F 17/00* (2006.01)

(52) U.S. Cl. ............... 705/30; 705/31; 705/34; 705/32; 715/705; 715/708; 715/711; 715/713; 715/714; 715/715; 715/226

(58) Field of Classification Search .............. 705/31, 705/30, 34; 715/705, 708, 711, 713, 714, 715/715, 226
See application file for complete search history.

(56) References Cited

U.S. PATENT DOCUMENTS

| 2004/0068693 | A1* | 4/2004 | Rawat et al. ............ 715/507 |
| 2006/0026531 | A1* | 2/2006 | Lin et al. ............... 715/809 |
| 2006/0179404 | A1* | 8/2006 | Yolleck et al. .......... 715/507 |
| 2008/0235567 | A1* | 9/2008 | Raj et al. ............... 715/226 |
| 2010/0161460 | A1* | 6/2010 | Vroom et al. ........... 705/31 |

FOREIGN PATENT DOCUMENTS

WO    WO 2009/151354    * 12/2009

OTHER PUBLICATIONS

Siber Systems, Roboform User Manual, 2007, http://web.archive.org/web/20071014183247/www.roboform.com/manual-pr.pdf.*

* cited by examiner

*Primary Examiner* — F. Ryan Zeender
*Assistant Examiner* — Allen Chein
(74) *Attorney, Agent, or Firm* — Osha Liang LLP

(57) ABSTRACT

A method for using a website, including detecting, using an agent executing on a central processing unit (CPU) and operatively coupled to a financial management application (FMA), a user accessing a webpage of the website by comparing a web address submitted by the user to a pre-determined web address of the webpage, analyzing the webpage based on a pre-determined template to identify a data entry field, identifying, using the agent executing on the CPU, data managed within the FMA for populating the data entry field, wherein the data is identified by comparing the data entry field to a data model of the FMA, retrieving the data managed within the FMA to generate retrieved data, and populating, using the agent executing on the CPU, the data entry field using the retrieved data based on the data model of the FMA.

21 Claims, 11 Drawing Sheets

ASSISTANCE INFORMATION F 404f
ASSISTANT WINDOW 401
WEBPAGE WINDOW 402

Mass.Gov — SEARCH

DEMO MODE

*Report Wages*
File Your Wage Report Online

*Mass Dept of Revenue WebFile for Business*

I want to...

YOUR CURRENT SESSION

GET HELP

Reporting Wages for:
Q3 2005 (Period Ending 9/30/2005)

Add New Employee
Last Name — First Name — SSN — Wages

Add Employee

Employee List
Last Name — First Name — SSN — Wages — Delete

| | | | 4000.00 | □ |
| | | | 5000.00 | □ |
| | | | 5000.00 | □ |
| | | | 5000.00 | □ |

Sav 5000.00 — Wage Report

DATA ENTRY FIELD C 403c

QuickBooks Payroll Assistant

Step 3 of 3: Update Q3 wages
When you're done updating the employee wages, click the red "File Wage Report" button on the state website.

| Name | SS# | Wages |
|------|-----|-------|
| | | 5000.00 |
| | | 5000.00 |
| | | 5000.00 |
| | | 5000.00 |

Back

FMA DATA B 405b

SCREEN SHOT 400f

FIG. 4G

PAYROLL E-FILE AND E-PAY ASSISTANT

BACKGROUND

Computerized financial management applications (FMA) are widely used by businesses for tracking, analysis, planning, implementation, and control of business transactions, financial data reporting, and management decision making including maintaining bank accounts, developing financial statements, performing cash flow and financial analysis, etc.

Electronic tax filing (or e-filing) is a process where tax documents are submitted to government agency (e.g., Internal Revenue Service (IRS), state taxation agency, etc.) through the internet or direct connection, usually without the need to submit any paper documents. Electronic payment (or e-payment) refers to the computer-based systems used to perform financial transactions electronically. Government agencies typically accept e-payment for tax liabilities. E-payment may also be referred to as electronic fund transfer (EFT).

When a user of a FMA makes payroll tax payments or files payroll tax forms directly on government agency's website, the user does not have the benefit of payroll information (e.g., liabilities owed, account number, employee information, etc.) maintained within the FMA. In addition, once the payment or filing is complete, the user has to manually update the information in the FMA in order to track the fact the completion of payroll tax payments or filings.

SUMMARY

In general, in one aspect, the invention relates to a method for using a website. The method steps include detecting, using an agent executing on a central processing unit (CPU) and operatively coupled to a financial management application (FMA), a user accessing a webpage of the website by comparing a web address submitted by the user to a pre-determined web address of the webpage, analyzing the webpage based on a pre-determined template to identify a data entry field, identifying, using the agent executing on the CPU, data managed within the FMA for populating the data entry field, wherein the data is identified by comparing the data entry field to a data model of the FMA, retrieving the data managed within the FMA to generate retrieved data, and populating, using the agent executing on the CPU, the data entry field using the retrieved data based on the data model of the FMA.

In general, in one aspect, the invention relates to a method for using a website. The method steps include obtaining data to populate a financial management application (FMA) of a user, submitting, by the user of the FMA and from a computer of the user, a web address to access a webpage of the website, wherein the webpage comprises a data entry field, populating the data entry field using an agent executing on a central processor of the computer, wherein the agent is configured to detect the user accessing the webpage by comparing the web address to a pre-determined web address of the webpage, analyze the webpage based on a pre-determined template to identify the data entry field, and identify the data by comparing the data entry field to a data model of the FMA, retrieve the data to generate retrieved data when the webpage is displayed in response to the user submitting the web address, and populate the data entry field using the retrieved data based on the data model of the FMA, submitting the retrieved data populated in the data entry field to the website, and receiving an acknowledgement from the website.

In general, in one aspect, the invention relates to a system for using a website. The system includes a financial management application (FMA), an agent operatively coupled to the FMA and executing on a central processing unit (CPU), including a webpage detection module configured to detect a web address submitted by a user to access a webpage of the website, wherein the webpage comprises a data entry field, a webpage analyzer configured to analyze the webpage based on a pre-determined template to identify the data entry field, a FMA data analyzer configured to identify data managed within the FMA for populating the data entry field, wherein the data is identified by comparing the data entry field to a data model of the FMA, a user module configured to retrieve the data managed within the FMA to generate retrieved data and populate the data entry field using the retrieved data based on the data model of the FMA, and a repository storing the pre-determined web address, the pre-determined template, the data managed within the FMA, and the data model of the FMA.

In general, in one aspect, the invention relates to a computer readable medium storing instructions for using a website. The instructions, when executed by a processor, include functionality for detecting, using an agent executing on the processor and operatively coupled to a financial management application (FMA), a user accessing a webpage of the website by comparing a web address submitted by the user to a pre-determined web address of the webpage, analyzing the webpage based on a pre-determined template to identify a data entry field, identifying, using the agent, data managed within the FMA for populating the data entry field, wherein the data is identified by comparing the data entry field to a data model of the FMA, retrieving the data managed within the FMA to generate retrieved data, and populating, using the agent, the data entry field using the retrieved data based on the data model of the FMA.

Other aspects of the invention will be apparent from the following description and the appended claims.

BRIEF DESCRIPTION OF DRAWINGS

FIGS. 4A-4G depict screenshots of an example in accordance with one or more embodiments of the invention.

DETAILED DESCRIPTION

Figure 1:
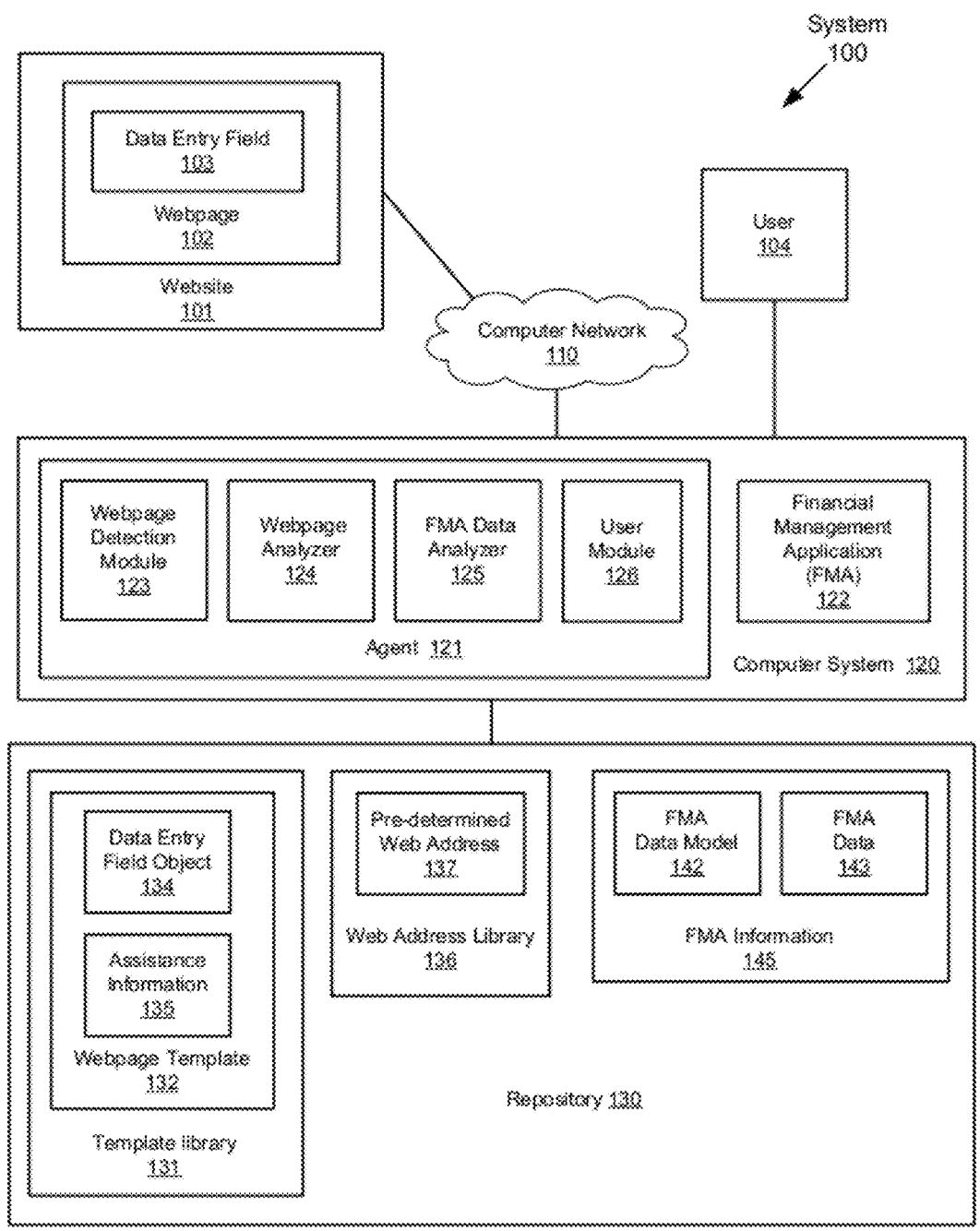
FIG. 1 depicts a schematic block diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method to facilitate a user, who uses a financial management application (FMA) to manage data of a business entity, in using a government agency website for payroll related e-filing or e-payment. Specifically, a helper application (e.g., an assistant agent in the form of a browser plug-in) may be triggered/activated when the user visits an agency website, for example to pay payroll taxes or to file payroll tax forms online. In particular, the helper application provides the user with appropriate information from the FMA to help completing the transaction. In one or more embodiments of the invention, the helper application detects the user's visit to the agency website based on profile information (e.g., the filing state) of the business entity maintained within the FMA. In one or more embodiments, the helper application provides assistance information relevant to the agency website. For example, the helper application may provide guidance/instructions to the user for navigating the agency website to complete the e-filing or e-payment. In one or more embodiments, the helper application provides relevant data required by the agency website for filing or payment. For example, when making a tax payment, the helper application may provide the liability amount owed based on the payroll transactions within the FMA. Further, the helper application may also populate the agency webpage by mapping the FMA data to data entry fields in the agency webpage. In one or more embodiments, the helper application updates the FMA with respect to the e-filing or e-payment transaction. For example, once the payment has been submitted, the helper application updates the FMA noting that the tax payment has been made and what the tracking/confirmation number is for the transaction.

Accordingly, the user may leverage the data maintained within the FMA for the e-filing or e-payment transactions conducted separately from the FMA using the government agency website.

FIG. 1 depicts a schematic block diagram of a system (100) in accordance with one or more embodiments of the invention. Those skilled in the art, having the benefit of this detailed description, will appreciate the components shown in FIG. 1 may differ among embodiments of the invention, and that one or more of the components may be optional. In one or more embodiments of the invention, one or more of the components shown in FIG. 1 may be omitted, repeated, supplemented, and/or otherwise modified from that shown in FIG. 1. Accordingly, the specific arrangement of components shown in FIG. 1 should not be construed as limiting the scope of the invention.

As shown in FIG. 1, the system (100) includes user (104), website (101) including webpages (e.g., webpage (102)) having data entry fields (e.g., data entry field (103)), as well as computer system (120) installed with FMA (122) and agent (121) having webpage detection module (123), webpage analyzer (124), FMA data analyzer (125), and user module (126). Throughout this document, depending on the context, the term "website" may be used to refer to a collection of webpages or the underlying infrastructure (e.g., web server) of the collection of webpages while access to any webpage of the website may be referred to as accessing the website. In addition, the computer system (120) is coupled with repository (130) storing template library (131) including webpage templates (e.g., webpage template (132) having data entry field objects (e.g., data entry field object (134)) and assistance information (e.g., assistance information (135)), web address library (136) including pre-determined web addresses (e.g., pre-determined web addresses (137)), and FMA information (145) including FMA data model (142) and FMA data (143). In addition, the computer system (120) is coupled to the website (101) via a computer network (110). In one or more embodiments of the invention, the computer network (110) may include multiple networks, point-to-point connections, or other suitable wired and wireless coupling configurations. For example, the Internet may be included in the computer network (110).

Although only one of each component is shown in FIG. 1, any number of each of these components may exist in the system (100) without deviating from the spirit of the invention. Although the FMA (122) and the agent (121) are shown to be separate components in the computer system (120), those skilled in the art will recognize that the FMA (122) and the agent (121) may be configured in many different configurations. In one or more embodiments of the invention, the agent (121) may be integrated in the FMA (122). For example, the agent (121) may be a user installable plug-in module to the FMA (122), an optional pre-configured module within the FMA (122), or a permanent built-in module within the FMA (122). In one or more embodiments of the invention, the agent (121) may be a stand alone application communicating with the FMA (122) based on a pre-determined interface. In one or more embodiments of the invention, the agent (121) may be integrated in a third party application (e.g., independent e-filing/e-payment service, etc.) communicating with the FMA (122) based on a pre-determined interface.

In addition, although the FMA (122) and the agent (121) are shown to be included in one computer system (120), those skilled in the art will recognize that multiple computers may be used where the FMA (122) and the agent (121) may be distributed across multiple computers in a variety of combinations. In one or more embodiments of the invention, the computer system (120) may include a computer (e.g., desktop computer, notebook computer, mobile computer, etc.) of the user (104). In one or more embodiments of the invention, the computer system (120) may include a server operated by a service provider hosting the FMA (122) to provide financial management services to the user (104). In one or more embodiments of the invention, the computer system (120) may include a combination of the aforementioned computer of the user (104), the aforementioned server operated by the service provider, and/or a server hosting the aforementioned third party application. In one or more embodiments of the invention, a portion (e.g., user module (126)) of the agent (121) may be installed on a mobile device (not shown). In such embodiments, the computer system (120) may include the mobile device (not shown).

Further, although not specifically described, each of the template library (131), webpage template (132), web addresses library (136), FMA information (145), FMA data model (142), and FMA data (143) may be implemented using various data structures such as a list, a file, a database, or any other suitable data structures.

Generally speaking, a web address is the address of a webpage on the computer network (110). Using the Internet as an example of the computer network (110), the web address includes a portion of a uniform resource locator (URL) including various components such as a domain, index, protocol, and other relevant portions. In particular, a website is typically associated with a domain name while each of the collection of webpages of the website is accessible via the domain name concatenated with an index specific to the particular webpage. Throughout this document depending on the context, the term "web address" may refer to the domain name, the domain name concatenated with the index, other URL component combinations suitable for accessing resources on the Internet, or all of the above as a group.

Generally speaking, government agencies (e.g., IRS, state taxation agencies, etc.) maintain websites (e.g., website (101)) with well known web addresses accessible by a user (e.g., user (104)) to make an online tax filing or payment. For example, the website (101) may correspond to the pre-determined web address (137) in the web address library (136) stored in the repository (130). The websites (e.g., website (101)) typically include a collection of webpages (e.g., webpage (102)) arranged in complex navigational structures that may differ among various agencies and may be updated from time to time. Each of the webpages (e.g., webpage (102)) may include one or more data entry fields (e.g., data entry field (103)) for the user (104) to input data required for making the tax filing or payment. Throughout this document, the term "user" refers to an individual (e.g., an accountant, an employee, a contractor, a sole proprietor, a partner, etc.) employed by or otherwise associated with a business entity (e.g., a corporation, a partnership, a sole proprietorship, etc.).

In one or more embodiments of the invention, the computer system (120) is installed with the FMA (122) that is configured for tracking, analyzing, planning, implementing, and controlling of business transactions as well as financial data reporting and management decision making of the business entity (not shown) associated with the user (104).

In one or more embodiments of the invention, the computer system (120) is installed with the agent (121) operatively coupled to the FMA (122) and configured to provide assistance information and relevant FMA data to facilitate the user (104) for making a tax filing and/or payment using the website (101).

In one or more embodiments of the invention, the agent (121) includes the webpage detection module (123) that is configured to detect an web address (not shown) submitted by the user (104) to access a webpage (e.g., webpage (102)) of the website (101). For example, the website (101) may be a government agency website such as a payroll tax filing website or a payroll tax payment website. In one or more embodiments, well known web addresses (e.g., pre-determined web address (137)) of various government agencies are stored in the web address library (136) for use by the webpage detection module (123). For example, the web address (not shown) submitted by the user (104) may be obtained or intercepted by the webpage detection module (123) and compared to each entry (e.g., pre-determined web address (137)) in the web address library (136) to detect the user accessing a government agency website (e.g., website (101)). In one or more embodiments, the web address library (136) may be updated from time to time to stay current with potential updates from the government agencies.

In one or more embodiments of the invention, the agent (121) may execute in a standby mode using the webpage detection module (123) to monitor user activities. Once the user access to the government agency website (101) is detected, other modules of the agent (121) may be activated/launched to provide various functionalities in an active mode of the agent (121). In the active mode, the webpage detection module (123) is configured to detect or intercept any webpage (e.g., webpage (102)) from the detected website (e.g., website (101)) that is being sent to the user computer in response to user interactions (e.g., populating data entry field (103)) with the website (e.g., website (101)) in completing the filing or payment.

In one or more embodiments, the webpage (102) is pre-analyzed to generate a webpage template (e.g., webpage template (132)) that describes a structure of the webpage (102) and is stored in the template library (131) for use by the webpage analyzer (124). As noted above, the webpage (102) includes one or more data entry fields (e.g., data entry field (103)) corresponding to a user name, a password, an employee name, an employee social security number, an employee wage, a tax liability amount, etc. Correspondingly, the webpage template (132) may include data entry field objects (e.g., data entry field object (134)) representing such data entry fields in the webpage (102). In the webpage template (132), the data entry field objects (e.g., data entry field object (134)) may be tagged with attributes corresponding to a user name, a password, an employee name, an employee social security number, an employee wage, a tax liability amount, etc. In addition, the webpage template (132) may also include metadata (not shown) describing how the data entry field objects (e.g., data entry field object (134)) fit in the structure of the webpage (102). In one or more embodiments, the template library (131) may be updated from time to time to stay current with potential updates from the government agencies.

In one or more embodiments of the invention, the agent (121) includes the webpage analyzer (124) that is configured to analyze (e.g., parse) the government webpages (e.g., webpage (102)) based on a webpage template (e.g., webpage template (132)) to identify a data entry field contained therein (e.g., data entry field (103)). For example, the webpage analyzer (124) may parse the webpage (102) to obtain a structure that is compared to webpage templates (e.g., webpage template (132)) in the template library (131). When a match is obtained in a particular webpage template (e.g., webpage template (132)), a data entry field (e.g., data entry field (103)) may be identified as corresponding to a data entry field object (e.g., data entry field object (134)) in the particular webpage template (e.g., webpage template (132)). In addition, the identified data entry field (e.g., data entry field (103)) may be further identified as corresponding to a user name, a password, an employee name, an employee social security number, an employee wage, a tax liability amount, etc. based on the attribute of the corresponding data entry field object (e.g., data entry field object (134)).

In one or more embodiments of the invention, the agent (121) includes the FMA data analyzer (125) that is configured to identify data (e.g., FMA data (143)) managed within the FMA (122) for populating the data entry field (e.g., data entry field (103)). For example, the FMA data (143) may be one of a user name, a password, an employee name, an employee social security number, an employee wage, a tax liability amount, etc. In one or more embodiments, the data (e.g., FMA data (143)) managed within the FMA (122) are stored in a data structure (e.g., a database) represented by the FMA data model (142) (e.g., a database schema). In one or more embodiments, the FMA data analyzer (125) compares the data entry field (103) (i.e., in the context of the attribute of the corresponding data entry field object) to the FMA data model (142) to identify relevant data required by the data entry field (103). Accordingly, the FMA data analyzer (125) maps the data managed within the FMA (122) to the data entry field (e.g., data entry field (103)).

In one or more embodiments, the webpage template (132) includes assistance information (e.g., assistance information (135)) pertinent to a corresponding webpage (e.g., webpage (102)) or a particular data entry field (e.g., data entry field (103)). The collection of such assistance information (e.g., assistance information (135)) in the template library (131) may be referred to as an assistance information library. For example, the assistance information (135) in the webpage template (132) corresponding to the webpage (102) may include pertinent explanations and or instructions generated based on information provided by the government agency maintaining the website (101).

In such embodiments, the FMA data analyzer (125) is further configured to identify assistance information (e.g., assistance information (135)) pertinent to a detected webpage (e.g., webpage (102)) from the assistance information library based on the webpage template (e.g., webpage template (132)) matching the detected webpage (e.g., webpage (102)). In some cases, the assistance information (e.g., assistance information (135)) may be specific to a particular data entry field (e.g., data entry field (103)) of the detected webpage (e.g., webpage (102)). In such cases, the FMA data analyzer (125) may further identify the assistance information (e.g., assistance information (135)) pertinent to the particular data entry field (e.g., data entry field (103)) from the assistance information library based on the data entry field (e.g., data entry field (103)) matching the data entry field object (e.g., data entry field object (134)) that is associated with the assistance information (e.g., assistance information (135)).

In one or more embodiments of the invention, the agent (121) includes the user module (126) that is configured to retrieve the data (e.g., FMA data (143)) managed within the FMA (122) (e.g., when the webpage (102) is displayed in response to the user (104) submitting the web address (not shown)) and populate the data entry field (103) (e.g., data entry field (103)) using the retrieved data (e.g., FMA data (143)) based on the FMA data model (142). In one or more embodiments, the retrieved data (e.g., FMA data (143)) is mapped to the data entry field (e.g., FMA data (143)) by the FMA data analyzer (125) for populating the data entry field (e.g., data entry field (103)).

Generally speaking, the agency webpage (102) accessed by the user is displayed in a browser window on a computer (e.g., computer system (120)). In one or more embodiments of the invention, the user module (126) is further configured to generate a browser window sidebar for displaying the FMA data (143) and the assistance information (135). As is known in the art, the sidebar is a graphical user interface element that displays various forms of information to a side of an application or desktop user interface. In one or more embodiments of the invention, the user module (126) is further configured to generate a separate window for displaying the FMA data (143) and the assistance information (135).

In one or more embodiments of the invention, the webpage detection module (123) is further configured to intercept the web address (not shown) submitted by the user (104). In such example, the intercepted web address is not sent to the computer network (110) directly for obtaining the webpage (102) in a browser window. In such embodiments, the user module (126) is further configured to obtain the webpage (102) using the intercepted web address (not shown) and generate a composite window. For example, the composite window includes a portion displaying the obtained webpage (102) and another portion displaying the FMA data (143) and the assistance information (135). In one or more embodiments, both portions of the composite window are disposed adjacent (e.g., butted or otherwise attached) to each other.

In one or more embodiments of the invention, the user module (126) is further configured to receive a user approval in response to displaying the FMA data (143). Specifically, the user (104) approves the FMA data (143) to be used for populating the data entry field (103). For example, by giving the approval, the user (104) confirms that the FMA data (142) is up to date for filing, that the mapping from the FMA data (142) to the data entry field (103) is appropriate, and that the user decides to submit the FMA data (142) to the government agency. Accordingly, the user module (126) sends the FMA data (142) to the website (101) to populate the data entry field (103) of the webpage (102).

Figure 2:
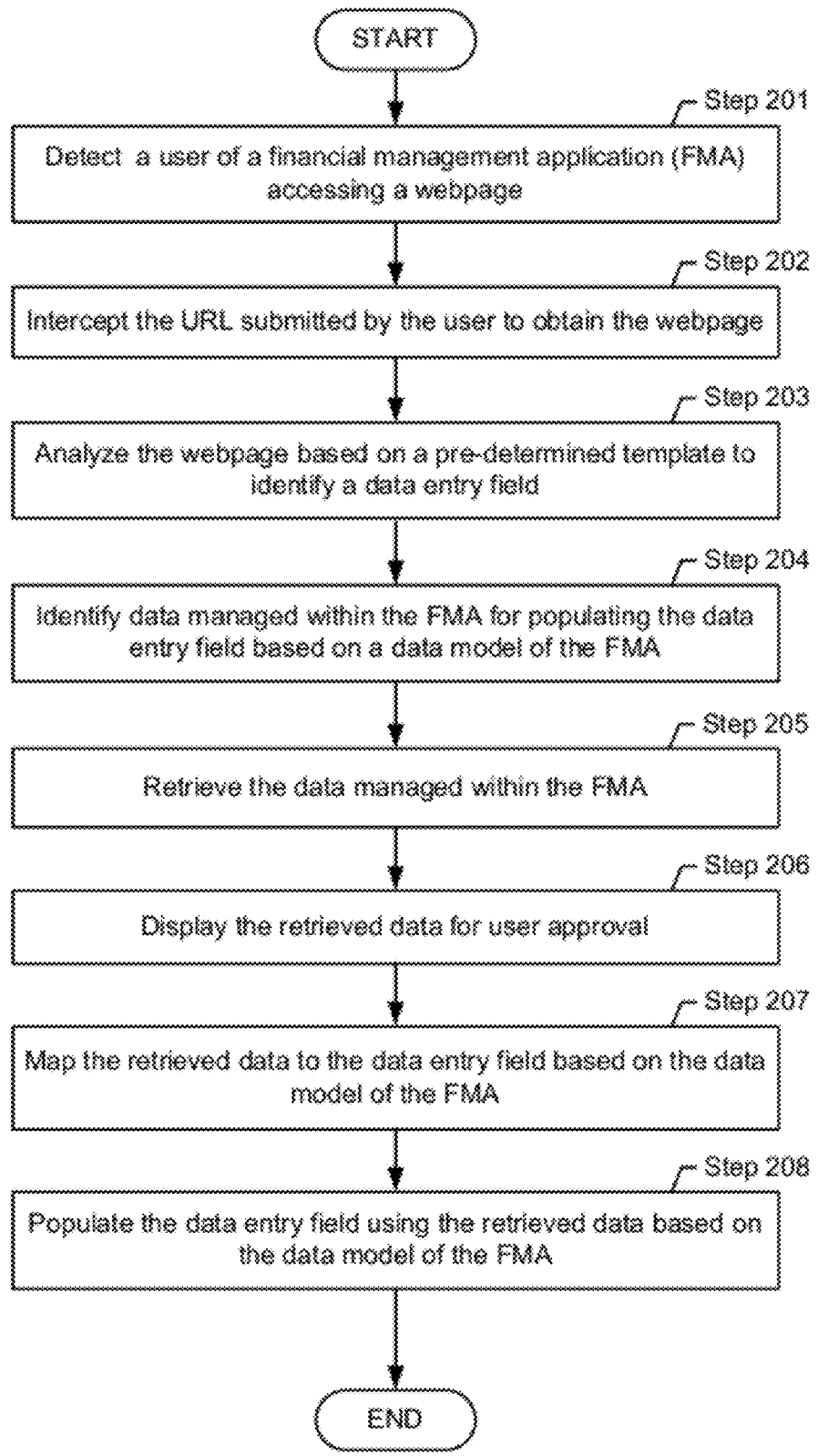
FIG. 2 depicts a flowchart of a method in accordance with one or more embodiments of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2.

The method as shown in FIG. 2 may be practiced using system (100) described with respect to FIG. 1 above. For example, a user uses a financial management application (FMA) to manage financial data of a business entity where the user may be an accountant, an employee, a contractor, a sole proprietor, a partner, etc. of the business entity.

As shown in FIG. 2, initially in Step 201, the user of the FMA accessing a webpage of a government agency is detected. In one or more embodiments of the invention, the detection is made by comparing a web address submitted by the user to a pre-determined web address of the government agency webpage stored in a web address library. Because the profile information of the user stored in the FMA may indicate the government agency to which the user is required to file tax forms or pay tax liabilities, well known government agency website web addresses may be determined accordingly and stored in the web address library.

In Step 202, the web address submitted by the user may optionally be intercepted. In one or more embodiments of the invention, instead of sending the web address directly to the Internet for obtaining the government agency webpage in a browser window, the web address is intercepted so that the webpage may be obtained indirectly and annotated with assistance information before presented to the user.

In Step 203, the webpage is analyzed based on a pre-determined template to identify a data entry field. In one or more embodiments of the invention, government agency webpages may be pre-analyzed to generate templates that describe structures of the webpages and are stored in a template library. Accordingly, when the webpage is analyzed (e.g., parsed) and the structure obtained therefrom matches one of the templates in the template library, the webpage and the data entry fields contained therein are identified.

In Step 204, data managed within the FMA is identified for populating the data entry field. For example, the webpage may belong to a payroll tax filing website of the government agency where employee data and employer data are required to populate various data entry fields for filing to the government agency. In another example, the webpage may belong to a payroll tax payment website of the government agency where payment amount and account information are required to populate various data entry fields for making payment to the government agency. Further, such various data entry fields may also include employee information (e.g., Social Security Number, wage, etc.) and employer accumulated tax amount withheld which has both an employer and an employee component, etc. In one or more embodiments of the invention, attributes of the various data entry fields are used to identify the types of data required for populating the various data entry fields.

In one or more embodiments of the invention, the data managed within the FMA is stored in a data structure (e.g., database) represented by a data model (e.g., database schema) of the FMA. Accordingly, the data is identified for populating the data entry field by comparing the data entry field to the data model of the FMA. For example, the data is identified when an attribute of the data entry field matches an attribute in the data model of the FMA. In one or more embodiments, the attribute may correspond to a user name, a password, an employee name, an employee social security number, an employee wage, a tax liability amount, etc.

In Step 205, the data managed within the FMA is retrieved to generate retrieved data. In Step 206, the retrieved data is displayed for user approval. In one or more embodiments of the invention, the retrieved data is displayed in a separate window of the browser window displaying the webpage. In one or more embodiments of the invention, the retrieved data is displayed in a sidebar of the browser window displaying the webpage. In one or more embodiments of the invention, the retrieved data is displayed in a bubble above data entry fields of the webpage. In one or more embodiments of the invention, the retrieved data is pre-populated in data entry fields of the webpage. In these various embodiments, the user approval can then be about populating the data entry field or about the submission of the pre-populated data depending on the implementation chosen.

In one or more embodiments of the invention, the web address submitted by the user is intercepted in the Step 202 and is not submitted directly for obtaining the webpage in the browser window. In such embodiments, the webpage is obtained using the intercepted web address and a composite window for displaying the webpage is generated. For example, the composite window includes a portion displaying the obtained webpage and another portion displaying the retrieved data from the FMA. In one or more embodiments, both portions of the composite window are disposed adjacent (e.g., butted or otherwise attached) to each other.

In Step 207, the retrieved data from the FMA is mapped to the data entry field based on the data model of the FMA. In one or more embodiments of the invention, the mapping is performed by matching an attribute (e.g., corresponding to one of a user name, a password, an employee name, an employee social security number, an employee wage, a tax liability amount, etc.) of the data entry field and an attribute in the data model of the FMA.

In Step 208, the data entry field is populated using the retrieved data from the FMA. In one or more embodiments of the invention, the retrieved data may be sent to the web browser displaying the webpage (and relayed therefrom to the agency website) for populating the data entry field. In one or more embodiments of the invention, the retrieved data may be sent directly to the agency website for populating the data entry field if the webpage is obtained by intercepting the user submitted web address in Step 202.

In one or more embodiments of the invention, populating the data entry field using the retrieved data is based on user approval of the retrieved data. For example, the user may approve that the retrieved data is up to date for filing, that the retrieved data is mapped correctly to the data entry field, and that the data is to be submitted to the government agency.

In one or more embodiments of the invention, assistance information relevant to the webpage or the data entry field is identified from an information library. In such embodiments, the assistance information is provided to the user, for example displayed in the separate window, the sidebar, or the composite window described above when the webpage is displayed in response to the user submitting the web address.

Figure 3:
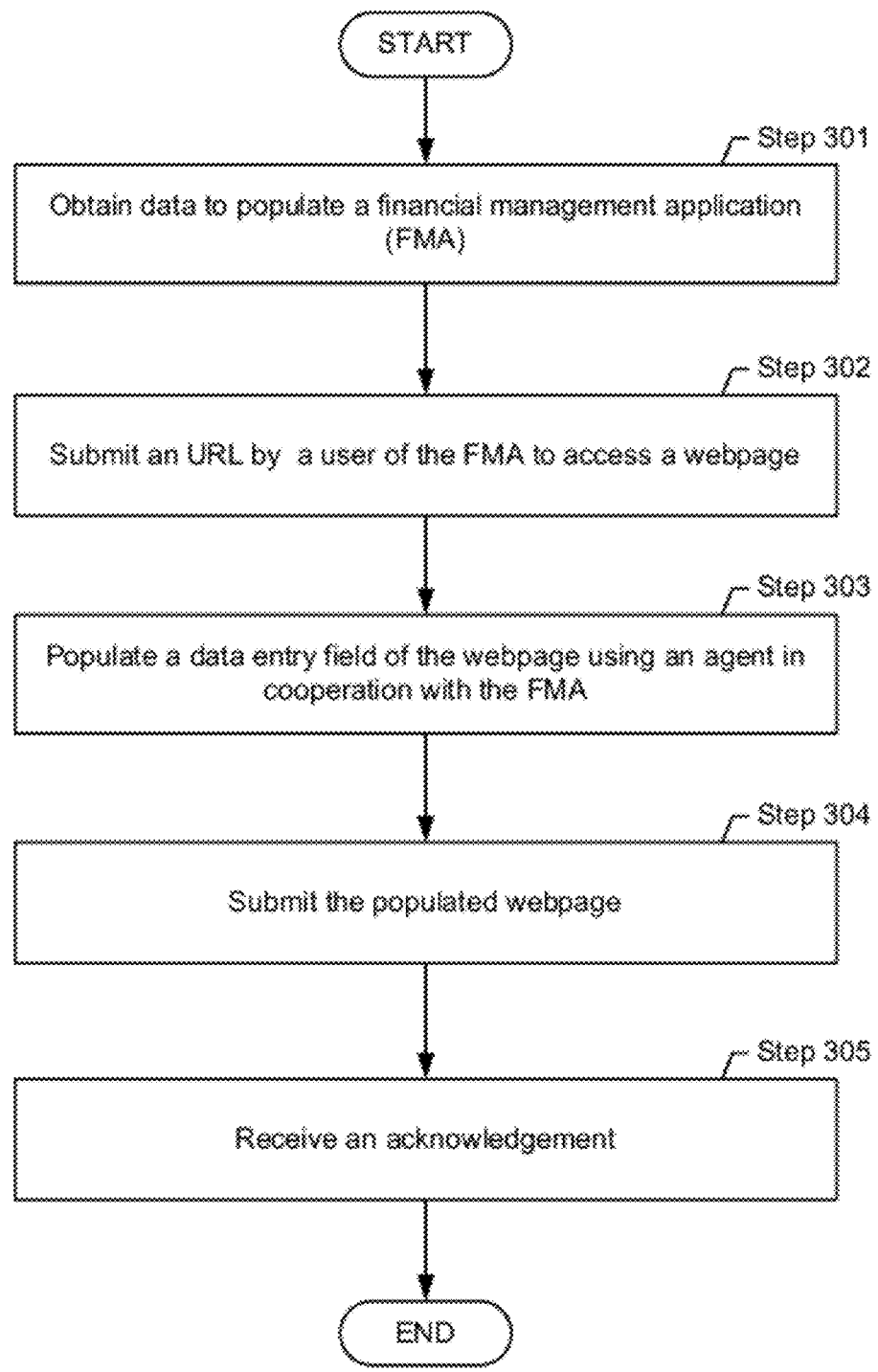
FIG. 3 depicts a flowchart of a method in accordance with one or more embodiments of the invention.

FIG. 3 depicts a flowchart of a method in accordance with one or more embodiments of the invention. In one or more embodiments of the invention, one or more of the steps shown in FIG. 3 may be omitted, repeated, and/or performed in a different order. Accordingly, embodiments of the invention should not be considered limited to the specific arrangements of steps shown in FIG. 3.

The method as shown in FIG. 3 may be practiced using system (100) described with respect to FIG. 1 above. For example, a user uses a financial management application (FMA) to manage financial data of a business entity where the user may be an accountant, an employee, a contractor, a sole proprietor, a partner, etc. of the business entity.

As shown in FIG. 3, initially in Step 301, data is obtained by the user to populate the FMA. For example, the data may be obtained from a financial institution (e.g., bank) of the business entity, an employee personnel database of the business entity, point-of-sale registers of the business entity, or other sources of financial data of the business entity.

In Step 302, the user submits, for example from a computer, a web address to access a webpage of a government agency website. For example, the webpage may belong to a payroll tax filing website and includes various data entry fields for filing employee data and employer data to the government agency. In another example, the webpage may belong to a payroll tax payment website and includes various data entry fields for submitting a payment amount and an account information to make a payment to the government agency.

In Step 303, the various data entry fields in the government agency webpage are populated using an agent in cooperation with the FMA. For example, the agent may be a user installable plug-in module to the FMA, an optional pre-configured module within the FMA, or a permanent built-in module within the FMA. In one or more embodiments of the invention, the agent is essentially the same as the agent (121) described in reference to FIG. 1 above that is configured to perform the method steps described in reference to FIG. 2 above.

In Step 304, the retrieved data is submitted to populate the data entry fields of the webpage. For example, the retrieved data may be sent to the web browser displaying the webpage or may be sent directly to the agency website for populating the data entry fields.

In Step 305, an acknowledgement is received from the website confirming the submission. For example, a filed tax form or a submitted payment may be confirmed by the acknowledgement.

FIGS. 4A-4G depict screen shots (400a-400g) of an example government agency website and helper application (i.e., agent (121) described in reference to FIG. 1) in accordance with one or more embodiments of the invention. The screen shots (400a-400g) illustrate a workflow of a user filing new employee information to a state government agency. Various data in the example depicted in FIGS. 4A-4G are fictitious data for illustration purposes only.

As shown in FIGS. 4A-4G, each of the screen shots (400a-400g) includes a webpage window (402) displaying various webpages of the state government agency website and an assistant window (401) displaying assistance information and/or FMA data. In the example, these windows are configured in such a manner that currently visited webpage and corresponding assistance information and/or FMA data replaces previously visited webpages and corresponding assistance information and/or FMA data in the two windows as the user navigates the state government agency website to complete the filing.

In one or more embodiments of the invention, the webpage window (402) is a browser window generated by a web browser installed on the user's computer while the assistant window (401) is a sidebar generated by the helper application. As shown, the sidebar is configured to butt the left side of the browser window. In other examples, the sidebar may be configured differently relative to the browser window In one or more embodiments of the invention, the webpage window (402) is a browser window generated by a web browser installed on the user's computer while the assistant window (401) is a separate window generated by the helper application. Although the webpage window (402) and the assistant window (401) are shown to butt against each other, the user may drag these two windows apart as desired.

In one or more embodiments of the invention, the webpage window (402) and the assistant window (401) are each a portion of a composite window generated by the helper application. Although the webpage window (402) and the assistant window (401) are shown to butt against each other, other configurations are equally possible.

Figure 4A:
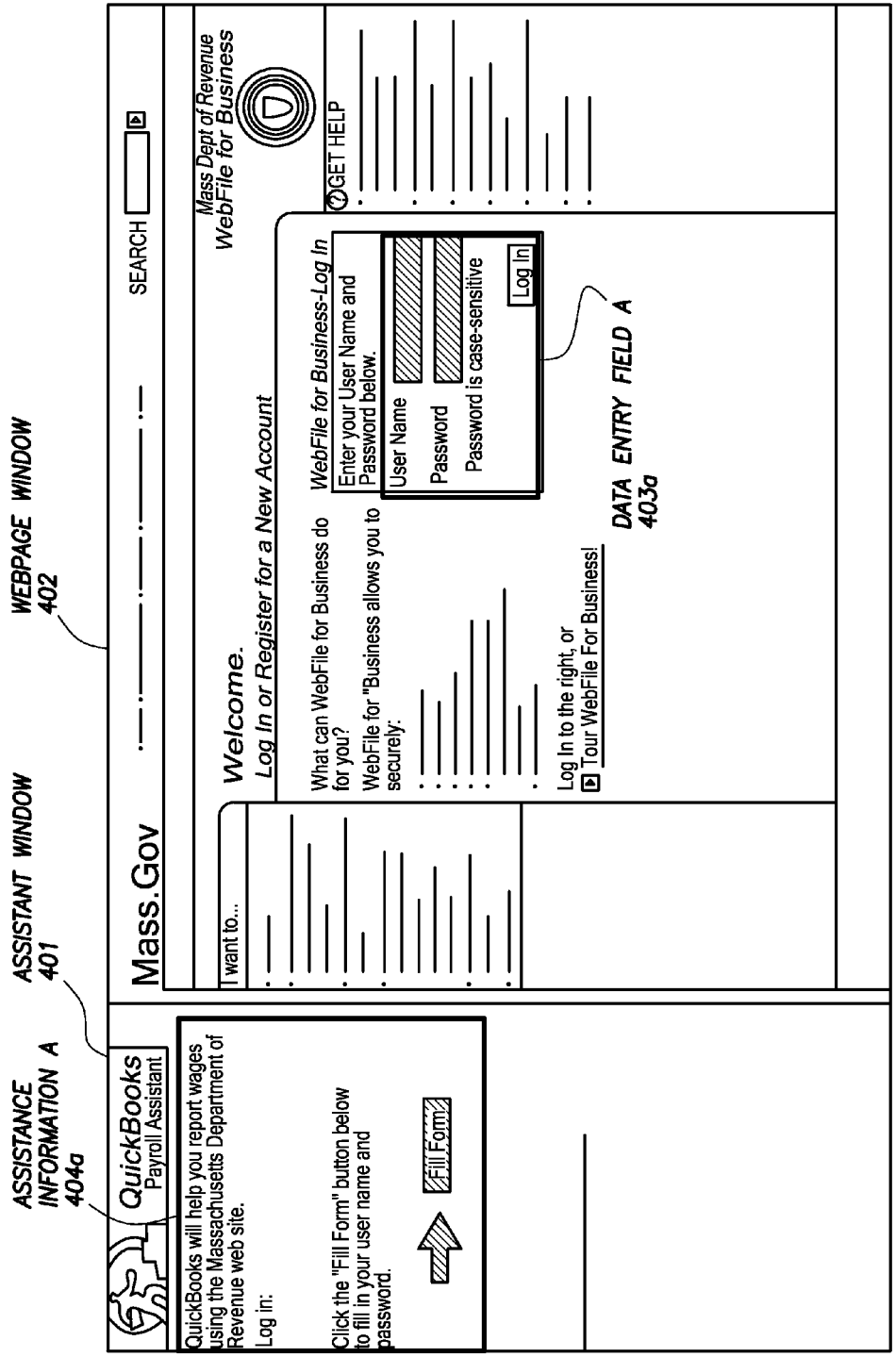

As shown in screen shot (400a) depicted in FIG. 4A, the webpage window (402) displays a login page of the state agency website with data entry field A (403a), namely username and password. As discussed above, the submission of the web address of this login page by the user triggers the helper application to launch and generate assistance information A (404a) based on an analysis of the login page identifying the data entry field A (403a). In the example depicted in FIG. 4A, the assistance information A (404a) is displayed in the assistant window (401) guiding the user to automatically enter the username and password by clicking the included "Fill Form" button. Once the user clicks the "Fill Form" button as instructed, the assistant window (401) and the webpage window (402) are refreshed as shown in screen shot (400b) depicted in FIG. 4B.

Figure 4B:
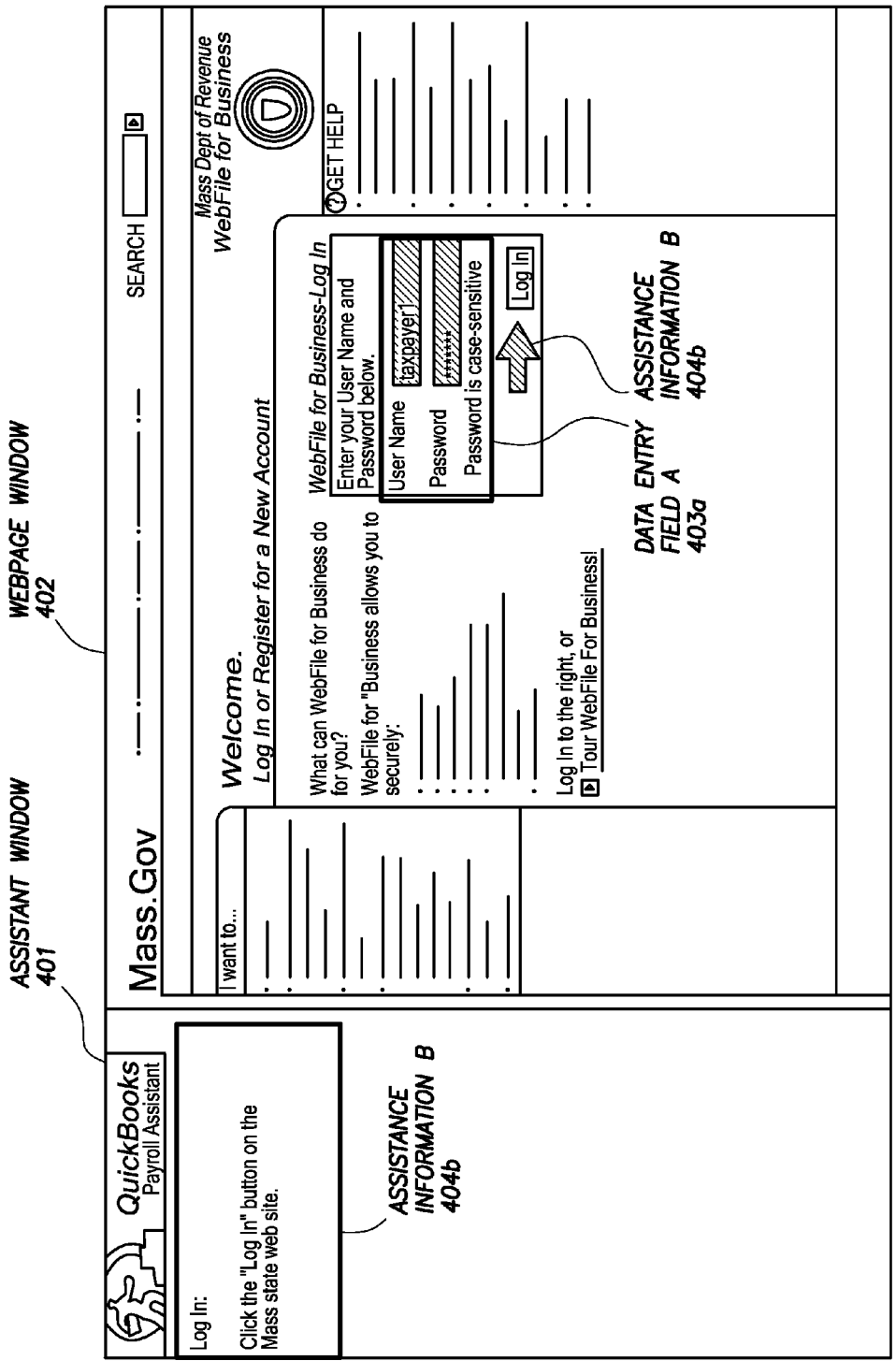

FIG. 4B shows the same login page displayed in the webpage window (402) with the data entry field A (403a) populated with the username "taxpayer1" and a hidden password, which are retrieved by the helper application from the FMA profile information of the user. In addition, the assistance information B (404b) now includes an instruction displayed in the assistant window (401) for the user to click a "Log In" button in the login page as well as an arrow in the webpage window (402) overlaying the login page pointing to the "Log In" button. Once the user clicks the "Log In" button as instructed, the username and password are transmitted to the state agency website, which re-directs the user to a selection page. Accordingly, the assistant window (401) and the webpage window (402) are refreshed as shown in screen shot (400c) depicted in FIG. 4C.

Figure 4C:
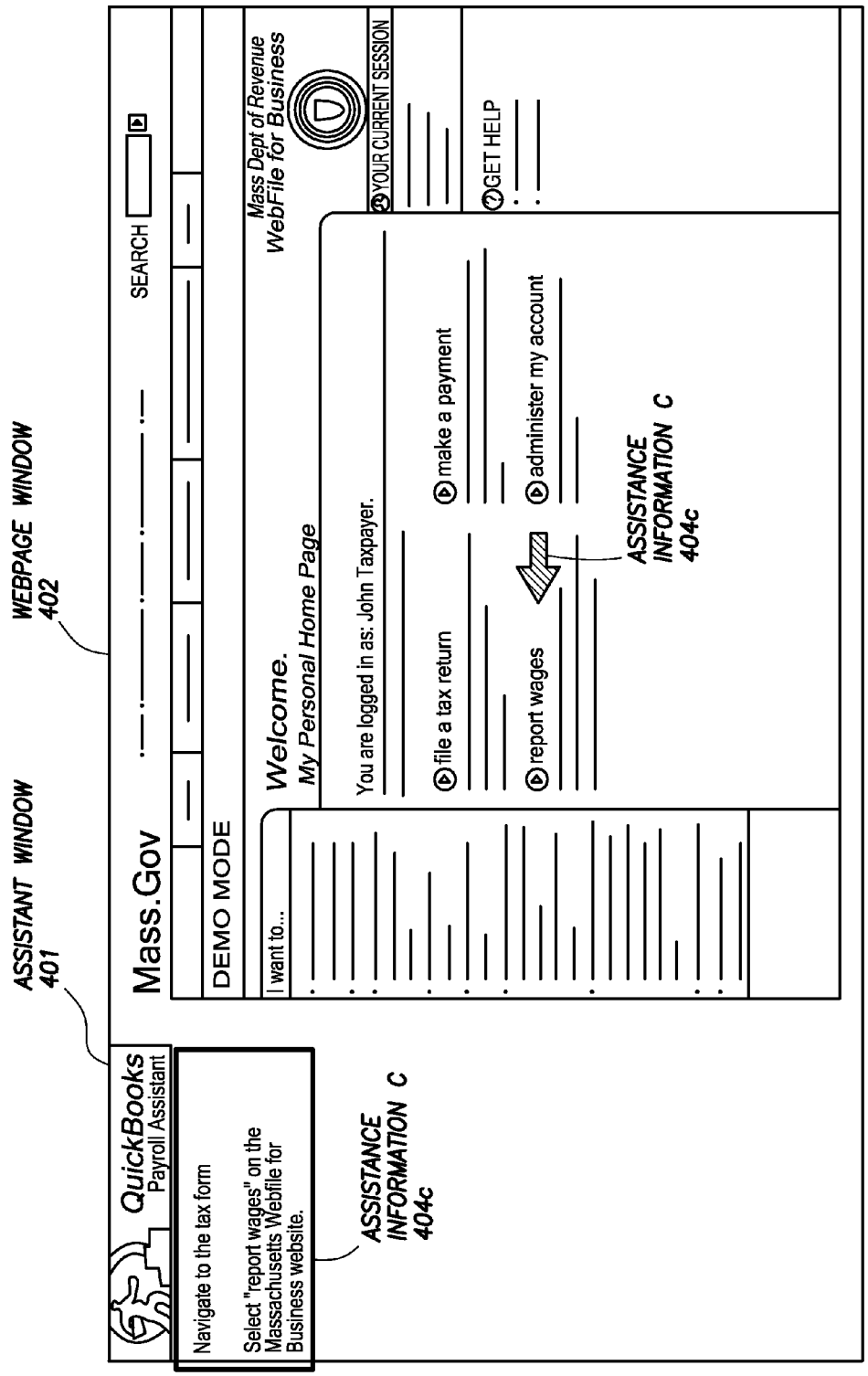

FIG. 4C shows the selection page displayed in the webpage window (402) showing four transactions that the user may select to complete. By detecting and analyzing the selection page, the helper application retrieves and displays assistance information C (404c) in the assistant window (401). In the example depicted in FIG. 4C, the user has made a prior indication (e.g., within the FMA or the assistant window (401) that is not shown in FIGS. 4A-4G) that wage reporting is being performed. In particular, the assistance information C (404c) now includes an instruction displayed in the assistant window (401) for the user to click a "report wages" selection in the selection page as well as an arrow in the webpage window (402) overlaying the selection page pointing to the "report wages" selection. Once the user clicks the "report wages" selection as instructed, the selection is transmitted to the state agency website, which re-directs the user to a reporting page. Accordingly, the assistant window (401) and the webpage window (402) are refreshed as shown in screen shot (400d) depicted in FIG. 4D.

Figure 4D:
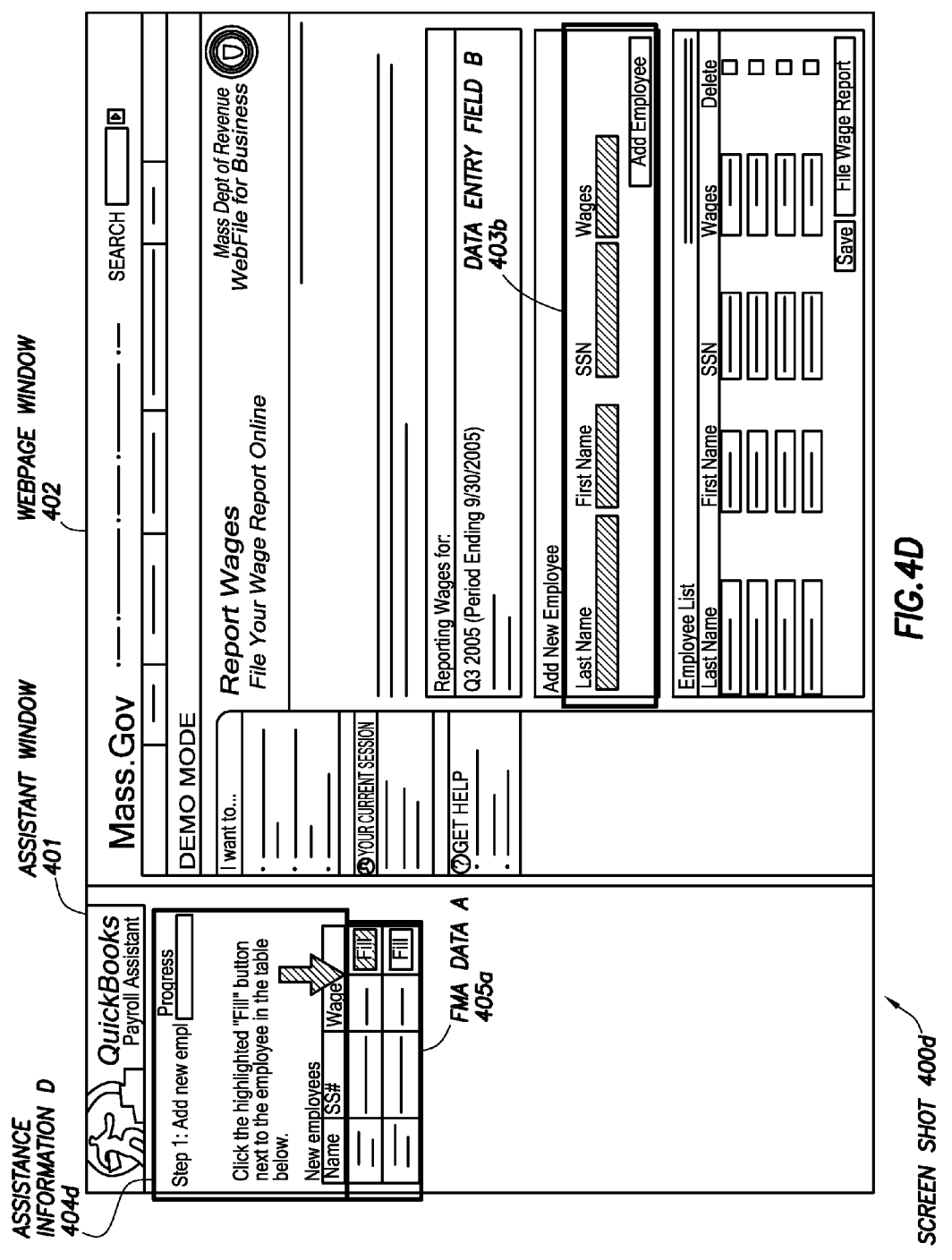

FIG. 4D shows the reporting page displayed in the webpage window (402) with the data entry field B (403b) related to new employee information with an action button "Add Employee". In addition, the assistant window (401) now displays the assistance information D (404d) relating to reporting new employees as well as FMA data A (405a) including pertinent information of two new employees each tagged with a "Fill" button. As discussed above, the helper application retrieves the assistance information D (404d) and the FMA data A (405a) based on an analysis of the reporting page. In particular, the assistance information D (404d) prompts the user to click the "Fill" button next to the employee information to be reported. Once the user clicks the "Fill" button as instructed, the helper application populates the data entry field B (403b) using the corresponding new employee information and activates the "Add Employee" button thereby transmitting it to the state agency website, which updates the reporting page as shown in screen shot (400e) depicted in FIG. 4E.

Figure 4E:
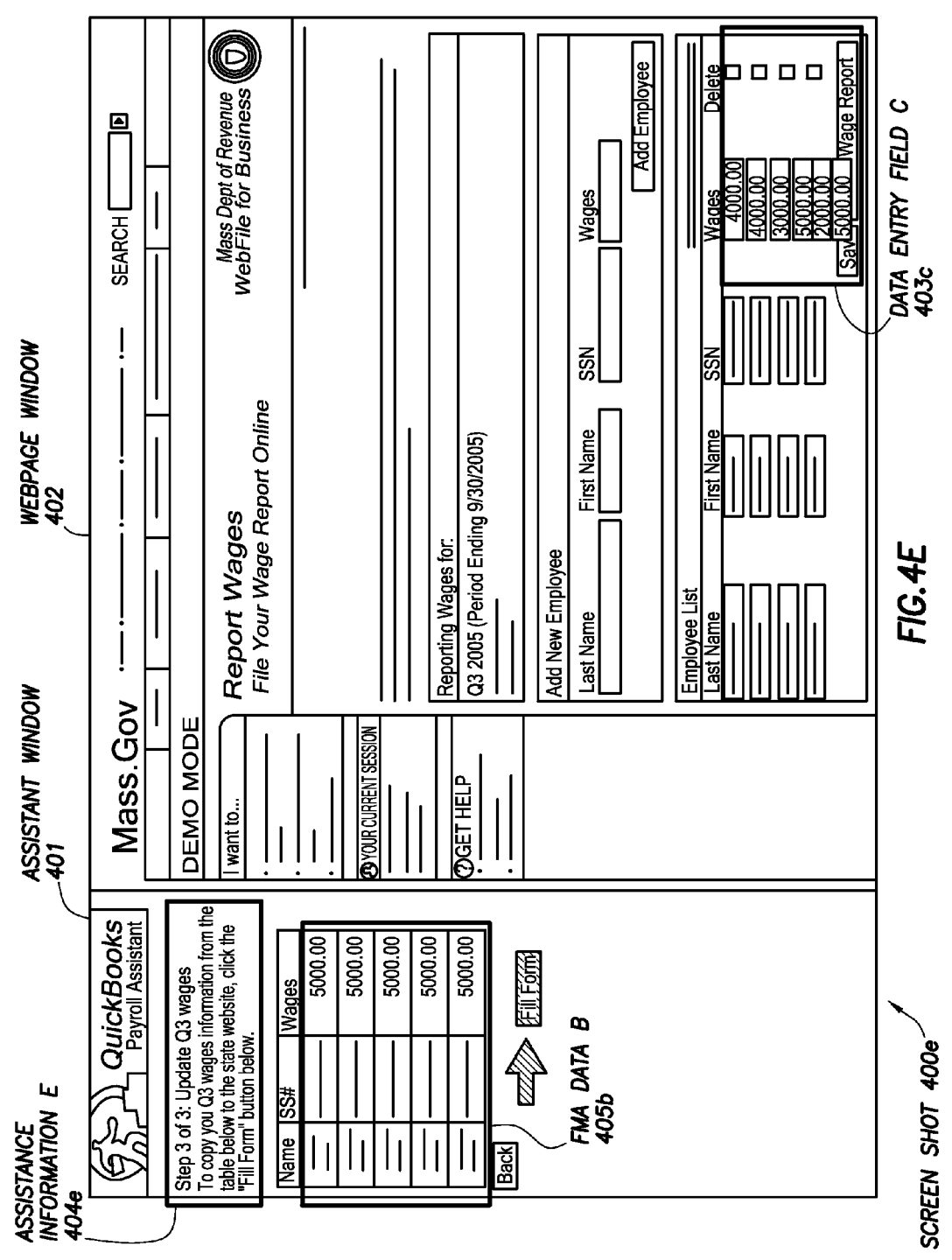

FIG. 4E shows the same reporting page displayed in the webpage window (402) with the addition of the two new employee's information included in the employee list section. The employee list section is shown to include the data entry field C (403c) populated with prior wage information. In addition, the assistant window (401) now displays the assistance information E (404e) relating to reporting updated Q3 wages as well as FMA data B (405b) including updated wage information of the employees. The assistance information E (404e) prompts the user to click the "Fill Form" button next to the employee wage information to be reported. Once the user clicks the "Fill Form" button as instructed, the data entry field C (403c) is updated using the FMA data B (405b) and the screen shot (400e) is updated to the screen shot (400f) depicted in FIG. 4F.

FIG. 4F shows the same reporting page displayed in the webpage window (402) with the data entry field C (403c) now populated with the updated employee Q3 wages, which are retrieved by the helper application from the FMA as the FMA data B (405b). In addition, the assistance information F (404f) now includes an instruction displayed in the assistant window (401) for the user to click a "File Wage Report" button in the reporting page while the FMA data B (405b) remains the same as screen shot (400e). Once the user clicks the "File Wage Report" button as instructed, the populated data entry field C (403c) is transmitted to the state agency website, which receives the filing and re-directs the user to an acknowledgement page. Accordingly, the assistant window (401) and the webpage window (402) are refreshed as shown in screen shot (400g) depicted in FIG. 4G.

Figure 4G:
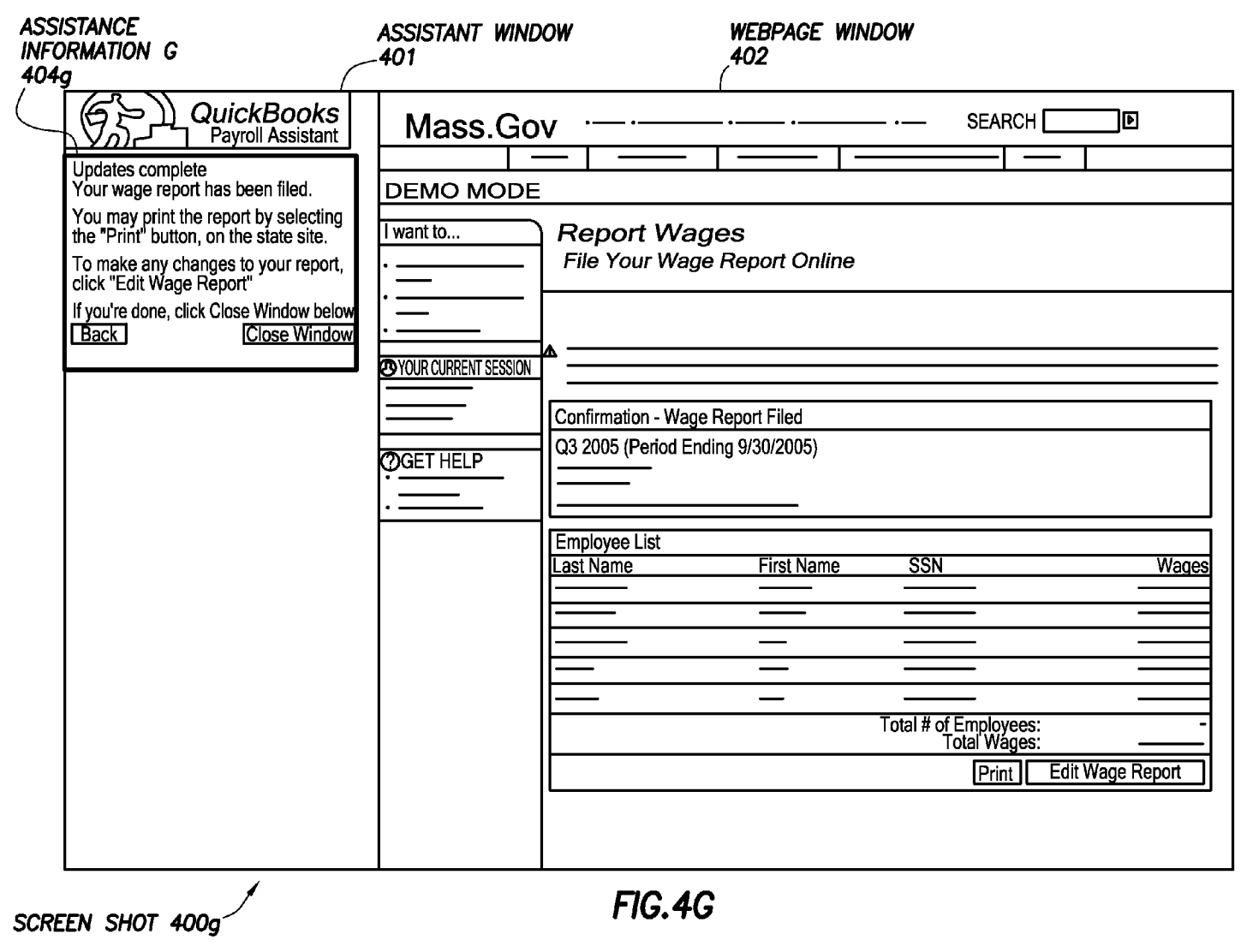

FIG. 4G shows the acknowledge page displayed in the webpage window (402) acknowledging that the wage report has been marked as completed. In addition, the assistance information G (404g) displayed in the assistant window (401) indicates the same.

Figure 5:
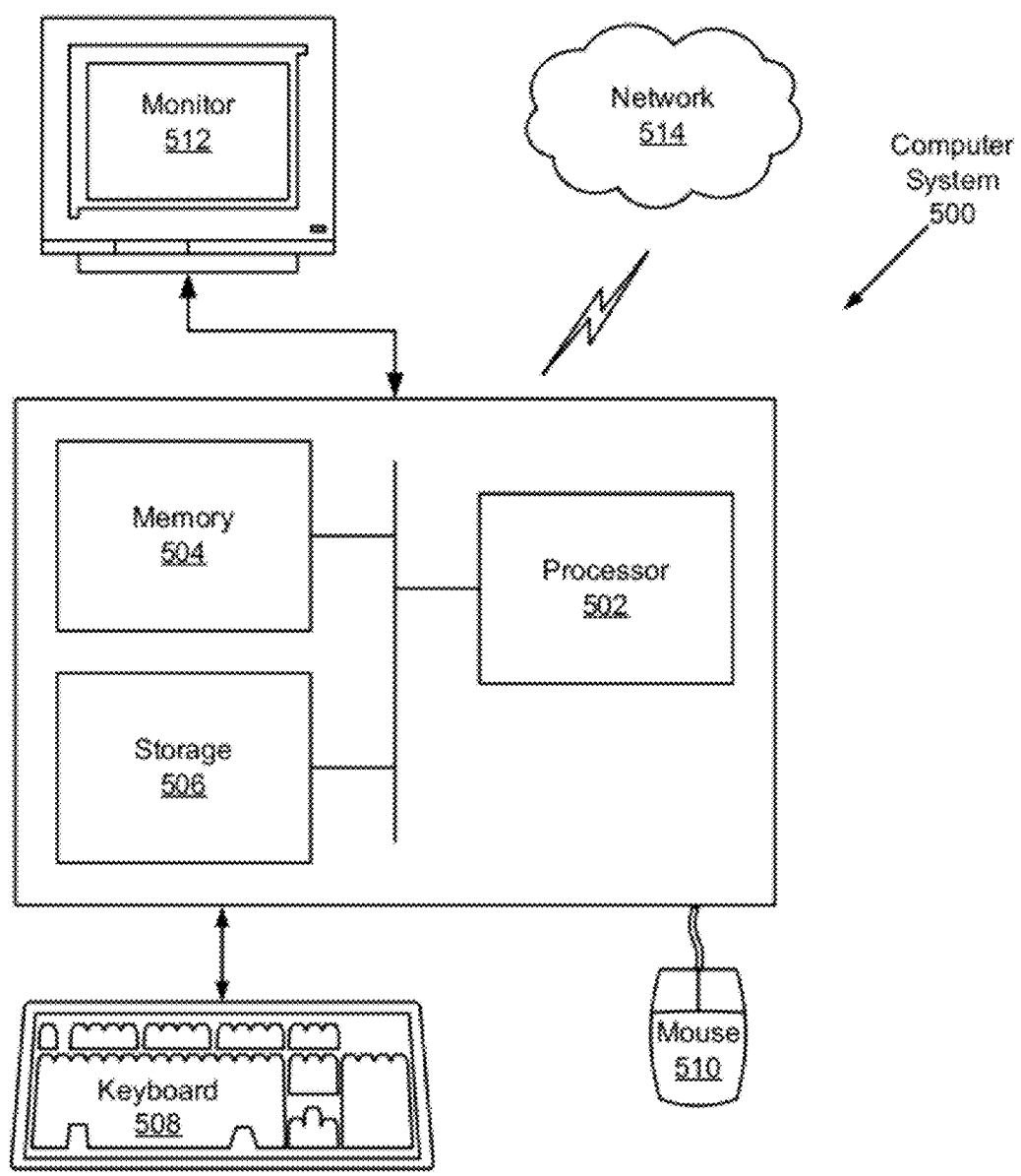
FIG. 5 depicts a computer system in accordance with one or more embodiments of the invention.

Embodiments of the invention may be implemented on virtually any type of computer regardless of the platform being used. For example, as shown in FIG. 5, a computer system (500) includes one or more hardware processor(s) (502) such as a Central Processing Unit (CPU), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer system (500) may also include input means, such as a keyboard (508), a mouse (510), or a microphone (not shown). Further, the computer system (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., report generator, event manager, user application, etc.) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, or any other tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for using a website, comprising:
   detecting, using an agent executing on a central processing unit (CPU) and operatively coupled to a financial management application (FMA), a user accessing a first webpage of the website by comparing a web address submitted by the user to a pre-determined web address of the first webpage, wherein the website is a government agency website separate from the FMA;
   identifying, based on a user action, a task being performed by the user within the FMA;
   analyzing the first webpage based on a first pre-determined template to identify a selection field based on the identified task;
   identifying, using the agent and prior to the user selecting the selection field, assistance information related to the selection field from an information library based on the first pre-determined template and the identified task;
   providing, using the agent, the assistance information to the user when the first webpage is displayed in response to the user submitting the web address, wherein the assistance information comprises:
      a text instruction directing the user to select the selection field; and
      a graphical image overlaying the first webpage and pointing to the selection field;
   displaying, in response to the user selecting the selection field based on the assistance information, a second webpage;
   analyzing the second webpage based on a second pre-determined template to identify a data entry field;
   identifying, using the agent, data managed within the FMA for populating the data entry field, wherein the data is identified by comparing the data entry field to a data model of the FMA;
   retrieving the data managed within the FMA to generate retrieved data;
   populating, using the agent, the data entry field using the retrieved data based on the data model of the FMA; and
   receiving, in response to populating the data entry field, an acknowledgement from the website indicating completion of the task.

2. The method of claim 1, further comprising mapping the retrieved data to the data entry field based on the data model of the FMA.

3. The method of claim 1, wherein the website is a payroll tax filing website of a government agency and wherein the data comprises employee data and employer data.

4. The method of claim 1, wherein the website is a payroll tax payment website of a government agency and wherein the data comprises a payment amount and account information.

5. The method of claim 1, further comprising:
   generating at least one selected from a group consisting of a separate window of a window displaying the second webpage and a sidebar of the window displaying the second webpage; and
   displaying the retrieved data in the at least one selected from a group consisting of the separate window and the sidebar,
   wherein the populating the data entry field using the retrieved data is based on user approval of the retrieved data in response to the user viewing the displayed retrieved data.

6. The method of claim 1, further comprising:
   generating, using the agent, a composite window; and
   displaying the retrieved data and the second webpage in the composite window,
   wherein the populating the data entry field using the retrieved data is based on user approval of the retrieved data in response to the user viewing the displayed retrieved data.

7. A method for using a website, comprising:
   obtaining data to populate a financial management application (FMA) of a user;
   submitting, by the user of the FMA and from a computer of the user, a web address to access a first webpage of the website, wherein the website is a government agency website separate from the FMA, wherein the webpage comprises a selection field;
   performing a task by the user within the FMA using an agent executing on a central processor of the computer, wherein the agent is configured to:
      detect the user accessing the first webpage by comparing the web address to a pre-determined web address of the first webpage;
      identify, based on a user action, the task being performed by the user within the FMA;
      analyze the first webpage based on a first pre-determined template to identify the selection field as corresponding to the identified task;
      identify, prior to the user selecting the selection field, assistance information related to the selection field from an information library based on the first pre-determined template and the identified task;
      provide the assistance information to the user when the first webpage is displayed in response to the user submitting the web address, wherein a second webpage is displayed in response to the user selecting the selection field based on the assistance information, wherein the assistance information comprises:
         a text instruction directing the user to select the selection field; and
         a graphical image overlaying the first webpage and pointing to the selection field;
      analyze the second webpage based on a second pre-determined template to identify a data entry field;

identify the data by comparing the data entry field to a data model of the FMA;
retrieve the data to generate retrieved data; and
populate the data entry field using the retrieved data based on the data model of the FMA;
submitting the retrieved data populated in the data entry field to the website; and
receiving an acknowledgement from the website indicating completion of the task.

8. The method of claim 7, wherein the website is a payroll tax filing website of a government agency and wherein the data comprises employee data and employer data.

9. The method of claim 7, wherein the website is a payroll tax payment website of a government agency and wherein the data comprises a payment amount and account information.

10. A system for using a website, comprising:
a financial management application (FMA);
an agent operatively coupled to the FMA and executing on a central processing unit (CPU), comprising:
   a webpage detection module configured to detect a web address submitted by a user to access a first webpage of the website, wherein the website is a government agency website separate from the FMA, wherein the webpage comprises a selection field;
   a webpage analyzer configured to:
      analyze the first webpage based on a first pre-determined template to identify the selection field as corresponding to a task being performed by the user within the FMA;
      identify, prior to the user selecting the selection field, assistance information related to the selection field from an information library based on the first pre-determined template and the task being performed by the user; and
      analyze a second webpage based on a second pre-determined template to identify a data entry field;
   a FMA data analyzer configured to identify data managed within the FMA for populating the data entry field, wherein the data is identified by comparing the data entry field to a data model of the FMA; and
   a user module configured to:
      identify, based on a user action, the task being performed by the user within the FMA;
      provide the assistance information to the user when the first webpage is displayed in response to the user submitting the web address, wherein the second webpage is displayed in response to the user selecting the selection field based on the assistance information, wherein the assistance information comprises:
         a text instruction directing the user to select the selection field; and
         a graphical image overlaying the first webpage and pointing to the selection field;
      retrieve the data managed within the FMA to generate retrieved data;
      populate the data entry field using the retrieved data based on the data model of the FMA;
      submit the retrieved data populated in the data entry field to the website; and
      receive an acknowledgement from the website indicating completion of the task; and
a repository storing the pre-determined web address, the first pre-determined template, the second pre-determined template, the information library, the data managed within the FMA, and the data model of the FMA.

11. The system of claim 10, the FMA data analyzer further configured to map the retrieved data to the data entry field based on the data model of the FMA.

12. The system of claim 10, wherein the website is a payroll tax filing website of a government agency and wherein the data comprises employee data and employer data.

13. The system of claim 10, wherein the website is a payroll tax payment website of a government agency and wherein the data comprises a payment amount and account information.

14. The system of claim 10, wherein user module is further configured to:
   generate at least one selected from a group consisting of a separate window of a window displaying the second webpage and a sidebar of the window displaying the second webpage; and
   display the retrieved data in the at least one selected from a group consisting of the separate window and the sidebar,
   wherein the populating the data entry field using the retrieved data is based on user approval of the retrieved data in response to the user viewing the displayed retrieved data.

15. The system of claim 10,
   wherein the user module is further configured to:
      generate a composite window; and
      display the retrieved data and the second webpage in the composite window,
      wherein the populating the data entry field using the retrieved data is based on user approval of the retrieved data in response to the user viewing the displayed retrieved data.

16. A non-transitory computer readable medium storing instructions for using a website, the instructions when executed by a processor comprising functionality for:
   detecting, using an agent executing on the processor and operatively coupled to a financial management application (FMA), a user accessing a first webpage of the website by comparing a web address submitted by the user to a pre-determined web address of the first webpage, wherein the website is a government agency website separate from the FMA;
   identifying, based on a user action, a task being performed by the user within the FMA;
   analyzing the first webpage based on a first pre-determined template to identify a selection field based on the identified task;
   identifying, using the agent and prior to the user selecting the selection field, assistance information related to the selection field from an information library based on the first pre-determined template and the identified task;
   providing, using the agent, the assistance information to the user when the first webpage is displayed in response to the user submitting the web address, wherein the assistance information comprises:
      a text instruction directing the user to select the selection field; and
      a graphical image overlaying the first webpage and pointing to the selection field;
   displaying, in response to the user selecting the selection field based on the assistance information, a second webpage;
   analyzing the second webpage based on a second pre-determined template to identify a data entry field;
   identifying, using the agent, data managed within the FMA for populating the data entry field, wherein the data is identified by comparing the data entry field to a data model of the FMA;

retrieving the data managed within the FMA to generate retrieved data;

populating, using the agent, the data entry field using the retrieved data based on the data model of the FMA; and receiving, in response to populating the data entry field, an acknowledgement from the website indicating completion of the task.

17. The non-transitory computer readable medium of claim 16, the instructions when executed by the processor further comprising functionality for:

mapping the retrieved data to the data entry field based on the data model of the FMA.

18. The non-transitory computer readable medium of claim 16, wherein the website is a payroll tax filing website of a government agency and wherein the data comprises employee data and employer data.

19. The non-transitory computer readable medium of claim 16, wherein the website is a payroll tax payment website of a government agency and wherein the data comprises a payment amount and account information.

20. The non-transitory computer readable medium of claim 16, the instructions when executed by the processor further comprising functionality for:

generating at least one selected from a group consisting of a separate window of a window displaying the second webpage and a sidebar of the window displaying the second webpage; and displaying the retrieved data in the at least one selected from a group consisting of the separate window and the sidebar, wherein the populating the data entry field using the retrieved data is based on user approval of the retrieved data in response to the user viewing the displayed retrieved data.

21. The non-transitory computer readable medium of claim 16, the instructions when executed by the processor further comprising functionality for:

generating, using the agent, a composite window; and displaying the retrieved data and the second webpage in the composite window, wherein the populating the data entry field using the retrieved data is based on user approval of the retrieved data in response to the user viewing the displayed retrieved data.

* * * * *